United States Patent
Takahashi et al.

(10) Patent No.: US 7,110,636 B2
(45) Date of Patent: Sep. 19, 2006

(54) OPTICAL DEVICE CONTROL APPARATUS AND OPTICAL DEVICE CONTROL METHOD

(75) Inventors: Kenichiro Takahashi, Yokohama (JP); Masakazu Shigehara, Yokohama (JP); Makoto Katayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 35 days.

(21) Appl. No.: 10/887,301

(22) Filed: Jul. 9, 2004

(65) Prior Publication Data

US 2005/0025413 A1 Feb. 3, 2005

Related U.S. Application Data

(60) Provisional application No. 60/486,173, filed on Jul. 11, 2003.

(30) Foreign Application Priority Data

Jul. 11, 2003 (JP) .............................. P2003-273518

(51) Int. Cl.
 G02B 6/26 (2006.01)
 G02B 6/42 (2006.01)
(52) U.S. Cl. .......................................................... 385/18
(58) Field of Classification Search ..................... None
See application file for complete search history.

(56) References Cited

U.S. PATENT DOCUMENTS

| | | | | |
|---|---|---|---|---|
| 6,014,478 A * | 1/2000 | Spaeth | .......................... | 385/18 |
| 6,300,665 B1 * | 10/2001 | Peeters et al. | ............... | 257/415 |
| 6,697,547 B1 * | 2/2004 | Walter et al. | .................. | 385/16 |
| 6,775,043 B1 * | 8/2004 | Leung et al. | ................ | 359/224 |
| 2002/0076136 A1 | 6/2002 | Ducellier et al. | | |
| 2002/0191901 A1 * | 12/2002 | Jensen | .......................... | 385/24 |
| 2003/0012489 A1 * | 1/2003 | Oikawa | ........................ | 385/18 |
| 2004/0146298 A1 * | 7/2004 | Ikegame | ....................... | 398/45 |

* cited by examiner

*Primary Examiner*—Michelle Connelly-Cushwa
*Assistant Examiner*—Chris Chu
(74) *Attorney, Agent, or Firm*—McDermott Will & Emery LLP

(57) ABSTRACT

The inclination of a reflecting surface of a mirror is adjusted such that light outputted from an input optical fiber is reflected by the mirror so as to be fed into an output optical fiber. The normal direction of the reflecting surface of the mirror vibrates about a predetermined direction at a predetermined frequency. A part of the light propagating through the output optical fiber is taken out by a light-branching part, so as to be received by a photodiode, whereby an electric signal having a value corresponding to thus received quantity of light is outputted from a detection circuit. Whether or not the electric signal includes a component of the predetermined frequency or whether the component is strong or weak is detected, whereby whether or not there is optical coupling from the input optical fiber to the output optical fiber or the extent thereof is determined.

18 Claims, 3 Drawing Sheets

OPTICAL DEVICE CONTROL APPARATUS AND OPTICAL DEVICE CONTROL METHOD

CROSS-REFERENCE TO RELATED APPLICATION

This application claims priority to Provisional Application Ser. No. 60/486,173 filed on Jul. 11, 2003 which are hereby incorporated by reference in their entirety.

BACKGROUND OF THE INVENTION

1. Field of the Invention

The present invention relates to an apparatus and a method for controlling optical device in which light emitted from an input optical waveguide is reflected by an inclinable reflecting surface so as to be made incident on an output optical waveguide.

2. Related Background of the Invention

Known as an example of optical device including a mirror having an inclinable reflecting surface is one disclosed in Patent Document 1 (U.S. Patent Application Laid-Open No. 2002/0076136). This optical device is an optical switch including a plurality of input ports and a plurality of output ports, and can optically couple any input port selected from the plurality of input ports to any output port selected from the plurality of output ports. Here, the input and output ports to be optically coupled to each other are selected by adjusting the inclination of the reflecting surface of the mirror. Such a mirror having an inclinable reflecting surface is made by MEMS (microelectromechanical systems) technology, for example. In such a MEMS mirror, the inclination of the reflecting surface is set according to the applied voltage value.

In order for such an optical device to carry out its operations at a high accuracy, it is important that the inclination of the reflecting surface of the mirror be controlled with a high accuracy. Therefore, in the optical device disclosed in the above-mentioned Patent Document 1, an optical multiplexer and an optical demultiplexer are disposed in an optical path from the plurality of input ports to the plurality of output ports. The optical multiplexer inserts pilot light into the optical path. The pilot light is reflected by the mirror, and is taken out from the optical demultiplexer. Thus taken pilot light is detected by a sensor, so that the state of inclination of the reflecting surface of the mirror is detected, whereby its inclination is controlled.

SUMMARY OF THE INVENTION

However, though the above-mentioned optical device can detect and control the inclination of the reflecting surface of the mirror, it can neither detect nor control with a high accuracy whether or not there is optical coupling from an input port to an output port or an extent thereof.

For eliminating the problem mentioned above, it is an object of the present invention to provide an optical device control apparatus and an optical device control method which can detect and control with a high accuracy whether or not there is optical coupling or an extent thereof in the optical device.

The optical device control apparatus or method in accordance with the present invention is an apparatus or method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror. An optical module in accordance with the present invention comprises such an optical device and the optical device control apparatus in accordance with the present invention for controlling the optical device.

The optical device control apparatus comprises (1) a light-branching part for taking out a part of the light propagating through the output optical waveguide after being made incident thereon; (2) a light-detecting part for detecting an intensity of the light taken out by the light-branching part and outputting an electric signal having a value corresponding to thus detected intensity of light; and (3) a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to a result of the detection.

The optical device control method in accordance with the present invention comprises the steps of taking out a part of the light propagating through the output optical waveguide after being made incident on the output optical waveguide; obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to a result of the detection.

According to the present invention, the intensity of light propagating through the output optical waveguide after being made incident thereon is detected, whereby an electric signal having a value corresponding to the intensity of light is obtained. The normal direction of the reflecting surface of the mirror is driven by the mirror driving part, so as to vibrate at a predetermined frequency about a predetermined direction, and a component of the predetermined frequency in the electric signal is detected. According to the result of detection, whether or not there is optical coupling from the input optical waveguide to the output waveguide or an extent thereof is directly determined. Examples of the optical device include optical switches, variable optical attenuators, and wavelength-selecting switches.

Preferably, the control part of the optical device control apparatus in accordance with the present invention controls the extent of optical coupling from the input optical waveguide to the output optical waveguide by ordering the mirror driving part to adjust the normal direction of the reflecting surface of the mirror according to the result of detection. Preferably, the optical device control method in accordance with the present invention controls the extent of optical coupling from the input optical waveguide to the output optical waveguide by ordering the mirror driving part to adjust the normal direction of the reflecting surface of the mirror according to the result of detection. When the optical device is an optical switch, for example, the extent of optical coupling from the input optical waveguide to the output optical waveguide is controlled so as to become the maximum value or a value not smaller than a certain threshold. When the optical device is a variable optical attenuator, the extent of optical coupling from the input optical waveguide to the output optical waveguide is controlled so as to become a certain set value.

When the optical device comprises a plurality of mirrors, it is preferred that the control part of the optical device control apparatus in accordance with the present invention orders the mirror driving part to vibrate respective normal directions of reflecting surfaces of the mirrors at frequencies different from each other. Preferably, in this case, the optical device control method in accordance with the present invention orders the mirror driving part to vibrate respective normal directions of reflecting surfaces of the mirrors at frequencies different from each other. This makes it possible to determine by which mirror the light coupled to an output optical fiber is reflected.

When the optical device comprises a plurality of input optical waveguides, it is preferred that the control part of the optical device control apparatus in accordance with the present invention orders the mirror driving part to vibrate the normal direction of the reflecting surface of the mirror at respective frequencies different from each other for the input optical waveguides. Preferably, in this case, the optical device control method in accordance with the present invention orders the mirror driving part to vibrate the normal direction of the reflecting surface of the mirror at respective frequencies different from each other for the input optical waveguides. This makes it possible to determine from which input optical fiber the light coupled to an output optical fiber is inputted.

When the optical device further comprises an optical multi/demultiplexing part for multiplexing or demultiplexing light onto an optical path from the input optical waveguide to the output optical waveguide, it is preferred that the control part of the optical device control apparatus in accordance with the present invention orders the mirror driving part to vibrate the normal direction of the reflecting surface of the mirror at respective frequencies different from each other for wavelengths of light multiplexed or demultiplexed by the optical multi/demultiplexing part. Preferably, in this case, the optical device control method in accordance with the present invention orders the mirror driving part to vibrate the normal direction of the reflecting surface of the mirror at respective frequencies different from each other for wavelengths of light multiplexed or demultiplexed by the optical multi/demultiplexing part. This makes it possible to determine at which wavelength the light is coupled to an output optical fiber.

When the optical device comprises a plurality of input optical waveguides and further comprises an optical multi/demultiplexing part for multiplexing or demultiplexing light onto an optical path from the input optical waveguide to the output optical waveguide, while the reflecting surface of the mirror is inclinable about each of two axes, it is preferred that the control part orders the mirror driving part to vibrate the normal direction of the reflecting surface of the mirror on a first surface at respective frequencies different from each other for the plurality of input optical waveguides, and vibrate the normal direction of the reflecting surface of the mirror on a second surface at respective frequencies different from each other for wavelengths of light multiplexed or demultiplexed by the optical multi/demultiplexing part. Preferably, in this case, the optical device control method in accordance with the present invention orders the mirror driving part to vibrate the normal direction of the reflecting surface of the mirror on a first surface at respective frequencies different from each other for the plurality of input optical waveguides, and vibrate the normal direction of the reflecting surface of the mirror on a second surface at respective frequencies different from each other for wavelengths of light multiplexed or demultiplexed by the optical multi/demultiplexing part. This makes it possible to determine from which input optical fiber and at which wavelength the light is coupled to an output optical fiber.

The control part of the optical device control apparatus in accordance with the present invention may order the mirror driving part to vibrate the reflecting surface of the mirror and detect the component of the predetermined frequency in the electric signal outputted from the light-detecting part for a plurality of mirrors either regularly or in response to a request from outside. The optical device control method in accordance with the present invention may order the mirror driving part to vibrate the reflecting surface of the mirror and detect the component of the predetermined frequency in the electric signal either regularly or in response to a request from outside. For regularly carrying out these operations, it will be sufficient if the mirror is always vibrated, which can simplify the configuration of the mirror driving part. Carrying out the operations in response to a request from outside can prevent vibrations at the same frequency from interfering with each other, for example, when a plurality of optical devices are connected to each other.

When the optical device comprises a plurality of mirrors, the control part of the optical device control apparatus in accordance with the present invention may order the mirror driving part to vibrate the reflecting surface of the mirror and detect the component of the predetermined frequency in the electric signal outputted from the light-detecting part either sequentially or simultaneously for the plurality of mirrors. In this case, the optical device control method in accordance with the present invention may order the mirror driving part to vibrate the reflecting surface of the mirror and detect the component of the predetermined frequency in the electric signal either sequentially or simultaneously for the plurality of mirrors. When a plurality of mirrors are sequentially processed, the number of A/D and D/A conversions is reduced, whereby the configuration of the mirror driving part can be made simpler. When a plurality of mirrors are simultaneously processed, on the other hand, the mirrors can be controlled at a high speed.

Though the present invention is one in which the extent of optical coupling to the output optical waveguide is changed by vibrating a mirror, it is not restrictive. The extent of optical coupling to the output optical waveguide may be changed by an action of any other constituent (e.g., electrooptic effect, magnetooptic effect, or polarized wave control by a liquid crystal) included in the optical device.

DESCRIPTION OF THE PREFERRED EMBODIMENTS

In the following, best modes for carrying out the present invention will be explained in detail with reference to the accompanying drawings. In the explanation of the drawings, constituents identical to each other will be referred to with symbols identical to each other without repeating their overlapping descriptions.

First Embodiment

Figure 1:
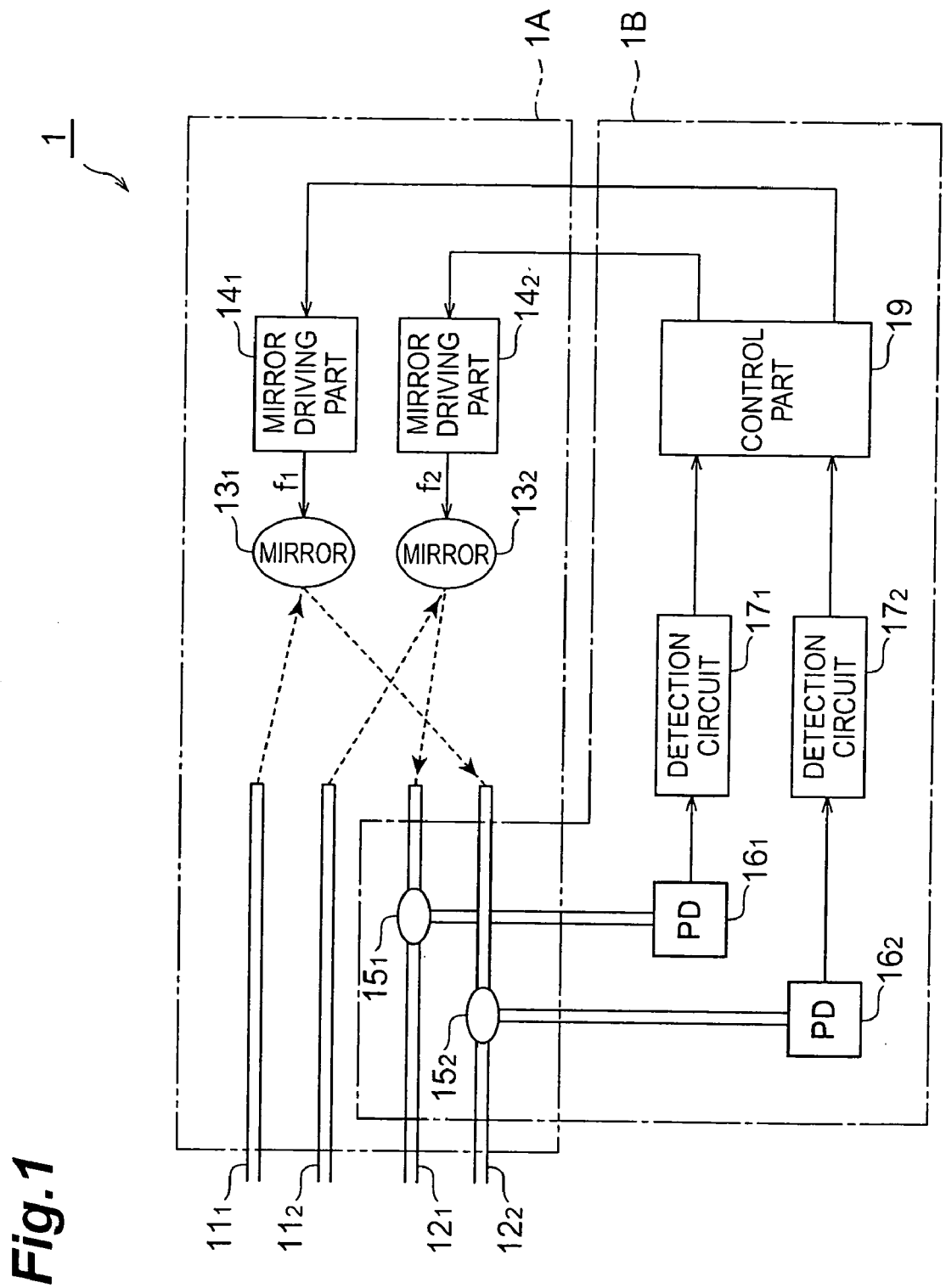
FIG. 1 is a diagram which shows a configuration of an optical module 1 in accordance with the first embodiment.

A first embodiment of an optical device control apparatus and method and optical module in accordance with the present invention will initially be explained. FIG. 1 is a diagram which shows a configuration of the optical module 1 in accordance with the first embodiment. The optical module 1 shown in this drawing comprises an optical device 1A and an optical device control apparatus 1B. The optical device 1A includes input optical fibers $11_1$, $11_2$; output optical fibers $12_1$, $12_2$; mirrors $13_1$, $13_2$; and mirror driving parts $14_1$, $14_2$. In the optical device 1A, light components emitted from respective end faces of the input optical fibers $11_1$, $11_2$ are made incident on any of end faces of the output optical fibers $12_1$, $12_2$. The optical device control apparatus 1B includes light-branching parts $15_1$, $15_2$; photodiodes $16_1$, $16_2$; detection circuits $17_1$, $17_2$; and a control part 19; and controls the optical device 1A.

Each of the mirrors $13_1$, $13_2$ has an inclinable reflecting surface. The mirror $13_1$ reflects the light emitted from the end face of the input optical fiber $11_1$ with the reflecting surface, and makes thus reflected light incident on the end face of any of the output optical fibers $12_1$, $12_2$. On the other hand, the mirror $13_2$ reflects the light emitted from the end face of the input optical fiber $11_2$ with the reflecting surface, and makes thus reflected light incident on the end face of any of the output optical fibers $12_1$, $12_2$.

According to an instruction from the control part 19, the mirror driving part $14_1$ drives the mirror $13_1$, so as to adjust the inclination of the reflecting surface of the mirror $13_1$. On the other hand, according to an instruction from the control part 19, the mirror driving part $14_2$ drives the mirror $13_2$, so as to adjust the inclination of the reflecting surface of the mirror $13_2$.

For achieving a small size, it will be preferred if each of the mirrors $13_1$, $13_2$ is made by MEMS technology. In this case, the mirror driving parts $14_1$, $14_2$ can adjust the inclinations of the reflecting surfaces of the mirrors $13_1$, $13_2$ by adjusting voltage values applied to the mirrors $13_1$, $13_2$.

The light-branching part $15_1$ is disposed in the output optical fiber $12_1$, and takes out a part of light propagating through the output optical fiber $12_1$ after being made incident on the end face of the output optical fiber $12_1$. On the other hand, the light-branching part $15_2$ is disposed in the output optical fiber $12_2$, and takes out a part of light propagating through the output optical fiber $12_2$ after being made incident on the end face of the output optical fiber $12_2$.

The photodiode $16_1$ receives the light component taken out by the light-branching light $15_1$ from the light propagating through the output optical fiber $12_1$, and outputs a current signal having a value corresponding to the intensity of thus received light. The detection circuit $17_1$ inputs the current signal outputted from the photodiode $16_1$, converts the current signal into a voltage signal, and outputs this voltage signal. The photodiode $16_1$ and detection circuit $17_1$ act as a light-detecting part for outputting an electric signal having a value corresponding to the intensity of light taken out by the light-branching part $15_1$.

The photodiode $16_2$ receives the light component taken out by the light-branching light $15_2$ from the light propagating through the output optical fiber $12_2$, and outputs a current signal having a value corresponding to the intensity of thus received light. The detection circuit $17_2$ inputs the current signal outputted from the photodiode $16_2$, converts the current signal into a voltage signal, and outputs this voltage signal. The photodiode $16_2$ and detection circuit $17_2$ act as a light-detecting part for outputting an electric signal having a value corresponding to the intensity of light taken out by the light-branching part $15_2$.

The control part 19 causes the mirror driving parts $14_1$, $14_2$ to control the respective inclinations of the reflecting surfaces of the mirrors $13_1$, $13_2$, thereby making the optical module 1 act as an optical switch. Namely, the control part 19 can cause the light outputted from the end face of the input optical fiber $11_1$ to be made incident on the end face of the output optical fiber $12_1$, and the light outputted from the end face of the input optical fiber $11_2$ to be made incident on the end face of the output optical fiber $12_2$. The control part 19 can cause the light outputted from the end face of the input optical fiber $11_1$ to be made incident on the end face of the output optical fiber $12_2$, and the light outputted from the end face of the input optical fiber $11_2$ to be made incident on the end face of the output optical fiber $12_1$. The control part 19 can cause both of the light components outputted from the respective end faces of the input optical fibers $11_1$ and $11_2$ to be made incident on the end face of the output optical fiber $12_1$. The control part 19 can cause both of the light components outputted from the respective end faces of the input optical fibers $11_1$ and $11_2$ to be made incident on the end face of the output optical fiber $12_2$.

In FIG. 1, the control part 19 causes the mirror $13_1$ to reflect the light outputted from the end face of the input optical fiber $11_1$, so as to make the light incident on the end face of the output optical fiber $12_2$, and also causes the mirror $13_2$ to reflect the light outputted from the end face of the input optical fiber $11_2$, so as to make the light incident on the end face of the output optical fiber $12_1$.

The control part 19 orders the mirror driving part $14_1$ to vibrate the normal direction of the reflecting surface of the mirror $13_1$ at a frequency $f_1$ about a predetermined direction, detects a component of the frequency $f_1$ in the electric signal outputted from the detection circuit $17_2$, and determines whether or not there is optical coupling from the input optical fiber $11_1$ to the output optical fiber $12_2$ or the extent thereof according to the result of detection. Further, according to the result of detection, the control part 19 orders the mirror driving part $14_1$ to adjust the normal direction of the reflecting surface of the mirror $13_1$, thereby controlling the extent of optical coupling from the input optical fiber $11_1$ to the output optical fiber $12_2$.

The control part 19 orders the mirror driving part $14_2$ to vibrate the normal direction of the reflecting surface of the mirror $13_2$ at a frequency $f_2$ about a predetermined direction, detects a component of the frequency $f_2$ in the electric signal outputted from the detection circuit $17_1$, and determines whether or not there is optical coupling from the input optical fiber $11_2$ to the output optical fiber $12_1$ or the extent thereof according to the result of detection. Further, according to the result of detection, the control part 19 orders the mirror driving part $14_2$ to adjust the normal direction of the reflecting surface of the mirror $13_2$, thereby controlling the extent of optical coupling from the input optical fiber $11_2$ to the output optical fiber $12_1$.

An example of operation of the optical module 1 in accordance with the first embodiment will now be explained together with the optical device control method in accordance with the first embodiment. Under the control of the control part 19, the optical module 1 operates as follows, for example. The light outputted from the end face of the input optical fiber $11_1$ is made incident on the reflecting surface of the mirror $13_1$, whereas the light outputted from the end face of the input optical fiber $11_2$ is made incident on the reflecting surface of the mirror $13_2$.

In response to an order to switch between optical paths from the control part 19, the mirror driving part $14_1$ adjusts the inclination of the reflecting surface of the mirror $13_1$ such that the light outputted from the end face of the input optical fiber $11_1$ is reflected by the mirror $13_1$ so as to be fed to the end face of the output optical fiber $12_2$. Taking the normal direction of the reflecting surface of the mirror $13_1$ after the adjustment as a predetermined direction, the normal direction of the reflecting surface of the mirror $13_1$ is driven by the mirror driving part $14_1$, so as to vibrate at the frequency $f_1$ about the predetermined direction. The light reflected by the reflecting surface of the mirror $13_1$ is fed to the end face of the output optical fiber $12_2$ and propagates through the output optical fiber $12_2$. A part of the guided light is caused to branch out and taken out by the light-branching part $15_2$, so as to be received by the photodiode $16_2$, whereby the detection circuit $17_2$ outputs an electric signal having a value corresponding to the quantity of light received.

As the reflecting surface of the mirror $13_1$ vibrates at the frequency $f_1$, the intensity of the light propagating through the output optical fiber $12_2$ is intensity-modified at the frequency $f_1$ with time, whereby the electric signal outputted from the detection circuit $17_2$ is also intensity-modified at the frequency $f_1$ with time. The control part 19 detects whether or not the electric signal includes a component of the frequency $f_1$ or whether the component is strong or weak. According to the result of detection, whether or not there is optical coupling from the input optical fiber $11_1$ to the output optical fiber $12_2$ or the extent thereof is determined. Further, according to the result of detection, the mirror driving part $14_1$ adjusts the normal direction of the reflecting surface of the mirror $13_1$ (the predetermined direction to become the center of vibration), whereby the extent of optical coupling from the input optical fiber $11_1$ to the output optical fiber $12_2$ is regulated so as to become a predetermined value (e.g., a maximum value, a value not smaller than a certain threshold, or a certain set value).

Similarly, in response to an order to switch between optical paths from the control part 19, the mirror driving part $14_2$ adjusts the inclination of the reflecting surface of the mirror $13_2$ such that the light outputted from the end face of the input optical fiber $11_2$ is reflected by the mirror $13_2$ so as to be fed to the end face of the output optical fiber $12_1$. Taking the normal direction of the reflecting surface of the mirror $13_2$ after the adjustment as a predetermined direction, the normal direction of the reflecting surface of the mirror $13_2$ is driven by the mirror driving part $14_2$, so as to vibrate at the frequency $f_2$ about the predetermined direction. The light reflected by the reflecting surf ace of the mirror $13_2$ is fed to the end face of the output optical fiber $12_1$ and propagates through the output optical fiber $12_1$. A part of the guided light is caused to branch out and taken out by the light-branching part $15_1$, so as to be received by the photodiode $16_1$, whereby the detection circuit $17_1$ outputs an electric signal having a value corresponding to the quantity of light received.

As the reflecting surface of the mirror $13_2$ vibrates at the frequency $f_2$, the intensity of the light propagating through the output optical fiber $12_1$ is intensity-modified at the frequency $f_2$ with time, whereby the electric signal outputted from the detection circuit $17_1$ is also intensity-modified at the frequency $f_2$ with time. The control part 19 detects whether or not the electric signal includes a component of the frequency $f_2$ or whether the component is strong or weak. According to the result of detection, whether or not there is optical coupling from the input optical fiber $11_2$ to the output optical fiber $12_1$ or the extent thereof is determined. Further, according to the result of detection, the mirror driving part $14_2$ adjusts the normal direction of the reflecting surface of the mirror $13_2$ (the predetermined direction to become the center of vibration), whereby the extent of optical coupling from the input optical fiber $11_2$ to the output optical fiber $12_1$ is regulated so as to become a predetermined value.

As such, the optical module 1 in accordance with this embodiment directly determines whether or not there is optical coupling from the input optical fiber to the output optical fiber or the extent thereof, and thus can detect and control the extent of optical coupling with a high accuracy. Vibrating the normal direction of the reflecting surface of one mirror $13_1$ at the frequency $f_1$ and the normal direction of the reflecting surface of the other mirror $13_2$ at the frequency $f_2$ ($\neq f_1$) can determine which of the mirrors $13_1$, $13_2$ reflects the light coupled to the output optical fiber $12_1$, $12_2$. Vibrating the normal direction of the reflecting surface of the mirror reflecting the light emitted from the end face of one input optical fiber $11_1$ at the frequency $f_1$ and the normal direction of the reflecting surface of the mirror reflecting the light emitted from the end face of the other input optical fiber $11_2$ at the frequency $f_2$ ($\neq f_1$) can determine from which of the input optical fibers $11_1$, $11_2$ the light coupled to the optical fiber $12_1$, $12_2$ is inputted.

The controller 19 may order the mirror driving parts $14_1$, $14_2$ to vibrate the reflecting surfaces of the mirrors $13_1$, $13_2$ and detect components of frequencies $f_1$, $f_2$ from the electric signals outputted from the detection circuits $17_1$, $17_2$ either regularly or in response to a request from outside (e.g., immediately after switching between paths from an input optical fiber to an output optical fiber). For regularly carrying out these operations, it will be sufficient if the mirrors $13_1$, $13_2$ are always vibrated, which can simplify the configuration of the mirror driving parts $14_1$, $14_2$. Carrying out the operations in response to a request from outside can prevent vibrations at the same frequency from interfering with each other, for example, when a plurality of optical devices are connected to each other.

The control part 19 may order the mirror driving parts $14_1$, $14_2$ to vibrate the reflecting surfaces of the mirrors $13_1$, $13_2$ and detect the components of frequencies $f_1$, $f_2$ in the electric signals outputted from the detection circuits $17_1$, $17_2$ either sequentially or simultaneously for the two mirrors $13_1$, $13_2$. When a plurality of mirrors are sequentially processed, the number of A/D and D/A conversions is reduced, whereby the configuration of the mirror driving parts $14_1$, $14_2$ can be made simpler. When a plurality of mirrors $13_1$, $13_2$ are simultaneously processed, on the other hand, the mirrors $13_1$, $13_2$ can be controlled at a high speed.

Second Embodiment

Figure 2:
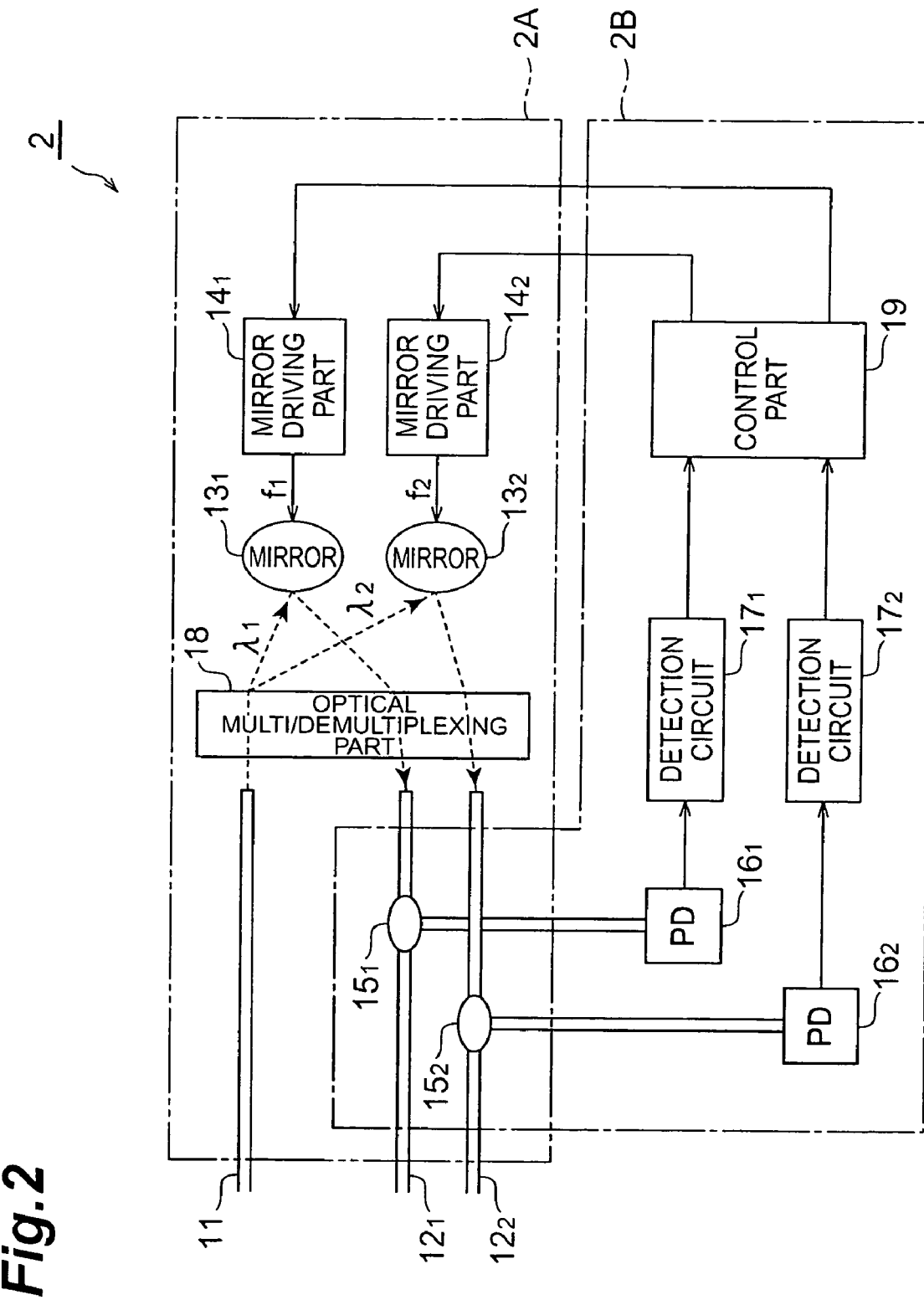
FIG. 2 is a diagram which shows a configuration of an optical module 2 in accordance with the second embodiment.

A second embodiment of the optical device control apparatus and method and optical module in accordance with the present invention will now be explained. FIG. 2 is a diagram which shows a configuration of the optical module 2 in accordance with the second embodiment. The optical module 2 shown in this drawing comprises an optical device 2A and an optical device control apparatus 2B. The optical device 2A includes an input optical fiber 11; output optical fibers $12_1$, $12_2$; mirrors $13_1$, $13_2$; and mirror driving parts $14_1$, $14_2$. Two wavelengths $\lambda_1$, $\lambda_2$ of light emitted from the end face of the input optical fiber 11 are made incident on the end face of any of the output optical fibers $12_1$, $12_2$. The optical device control apparatus 2B includes light-branching parts $15_1$, $15_2$; photodiodes $16_1$, $16_2$; detection circuits $17_1$, $17_2$; an optical multi/demultiplexing part 18; and a control part 19; and controls the optical device 2A. The optical module 2 in accordance with the second embodiment differs from the optical module 1 in accordance with the first embodiment in that it comprises a single input optical fiber 11 and further comprises the optical multi/demultiplexing part 18.

The optical multi/demultiplexing part 18 inputs and demultiplexes multiplexed light having two wavelengths $\lambda_1$, $\lambda_2$ emitted from the end face of the input optical fiber 11, and outputs one light component $\lambda_1$ to the mirror $13_1$, and the other light component $\lambda_2$ to the mirror $13_2$. The mirror $13_1$ reflects the light $\lambda_1$ outputted from the optical multi/demultiplexing part 18, such that thus reflected light $\lambda_1$ is incident on the end face of any of the output optical fibers $12_1$, $12_2$. On the other hand, the mirror $13_2$ reflects the light $\lambda_2$ outputted from the optical multi/demultiplexing part 18, such that thus reflected light $\lambda_2$ is incident on the end face of any of the output optical fibers $12_1$, $12_2$. The other constituents are the same as those in the first embodiment.

The control part 19 causes the mirror driving parts $14_1$, $14_2$ to control the respective inclinations of the reflecting surfaces of the mirrors $13_1$, $13_2$, thereby making the optical module 2 act as an optical switch. Namely, the control part 19 can cause the light $\lambda_1$ outputted from the end face of the input optical fiber 11 to be made incident on the end face of the output optical fiber $12_1$, and the light $\lambda_2$ outputted from the end face of the input optical fiber 11 to be made incident on the end face of the output optical fiber $12_2$. The control part 19 can cause the light $\lambda_1$ outputted from the end face of the input optical fiber 11 to be made incident on the end face of the output optical fiber $12_2$, and the light $\lambda_2$ outputted from the end face of the input optical fiber 11 to be made incident on the end face of the output optical fiber $12_1$. The control part 19 can cause both of the two wavelengths $\lambda_1$, $\lambda_2$ of light outputted from the end face of the input optical fiber 11 to be made incident on the end face of the output optical fiber $12_1$. The control part 19 can cause both of the two wavelengths $\lambda_1$, $\lambda_2$ of light outputted from the end face of the input optical fiber 11 to be made incident on the end face of the output optical fiber $12_2$.

In FIG. 2, the light $\lambda_1$ demultiplexed by the optical multi/demultiplexing part 18 after being outputted from the end face of the input optical fiber 11 is reflected by the mirror $13_1$, so as to be made incident on the end face of the output optical fiber $12_1$, and the light $\lambda_2$ demultiplexed by the optical multi/demultiplexing part 18 after being outputted from the end face of the input optical fiber 11 is reflected by the mirror $13_2$, so as to be made incident on the end face of the output optical fiber $12_2$.

The control part 19 orders the mirror driving part $14_1$ to vibrate the normal direction of the reflecting surface of the mirror $13_1$ at a frequency $f_1$ about a predetermined direction, detects a component of the frequency $f_1$ in the electric signal outputted from the detection circuit $17_1$, and determines whether or not there is optical coupling of the light $\lambda_1$ from the input optical fiber 11 to the output optical fiber $12_1$ or the extent thereof according to the result of detection. Further, according to the result of detection, the control part 19 orders the mirror driving part $14_1$ to adjust the normal direction of the reflecting surface of the mirror $13_1$, thereby controlling the extent of optical coupling of the light $\lambda_1$ from the input optical fiber 11 to the output optical fiber $12_1$.

The control part 19 orders the mirror driving part $14_2$ to vibrate the normal direction of the reflecting surface of the mirror $13_2$ at a frequency $f_2$ about a predetermined direction, detects a component of the frequency $f_2$ in the electric signal outputted from the detection circuit $17_2$, and determines whether or not there is optical coupling of the light $\lambda_2$ from the input optical fiber 11 to the output optical fiber $12_2$ or the extent thereof according to the result of detection. Further, according to the result of detection, the control part 19 orders the mirror driving part $14_2$ to adjust the normal direction of the reflecting surface of the mirror $13_2$, thereby controlling the extent of optical coupling of the light $\lambda_2$ from the input optical fiber 11 to the output optical fiber $12_2$.

An example of operation of the optical module 2 in accordance with the second embodiment will now be explained together with the optical device control method in accordance with the second embodiment. Under the control of the control part 19, the optical module 2 operates as follows, for example. The light components $\lambda_1$, $\lambda_2$ outputted from the end face of the input optical fiber 11 are demultiplexed by the optical multi/demultiplexing part 18, such that one light component $\lambda_1$ is made incident on the reflecting surface of the mirror $13_1$, whereas the other light component $\lambda_2$ is made incident on the reflecting surface of the mirror $13_2$.

In response to an order to switch between optical paths from the control part 19, the mirror driving part $14_1$ adjusts the inclination of the reflecting surface of the mirror $13_1$ such that the light $\lambda_1$ incident on the mirror $13_1$ is reflected thereby so as to be fed to the end face of the output optical fiber $12_1$. Taking the normal direction of the reflecting surface of the mirror $13_1$ after the adjustment as a predetermined direction, the normal direction of the reflecting surface of the mirror $13_1$ is driven by the mirror driving part $14_1$, so as to vibrate at the frequency $f_1$ about the predetermined direction. The light $\lambda_1$ reflected by the reflecting surface of the mirror $13_1$ is fed to the end face of the output optical fiber $12_1$ and propagates through the output optical fiber $12_1$. A part of the guided light is caused to branch out and taken out by the light-branching part $15_1$, so as to be received by the photodiode $16_1$, whereby the detection circuit $17_1$ outputs an electric signal having a value corresponding to the quantity of light received.

As the reflecting surface of the mirror $13_1$ vibrates at the frequency $f_1$, the intensity of the light $\lambda_1$ propagating through the output optical fiber $12_1$ is intensity-modified at the frequency $f_1$ with time, whereby the electric signal outputted from the detection circuit $17_1$ is also intensity-modified at the frequency $f_1$ with time. The control part 19 detects whether or not the electric signal includes a component of the frequency $f_1$ or whether the component is strong or weak. According to the result of detection, whether or not there is optical coupling of the light $\lambda_1$ from the input optical fiber 11 to the output optical fiber $12_1$ or the extent thereof is determined. Further, according to the result of detection, the mirror driving part $14_1$ adjusts the normal direction of the reflecting surface of the mirror $13_1$ (the predetermined direction to become the center of vibration), such that the extent of optical coupling of the light $\lambda_1$ from the input optical fiber 11 to the output optical fiber $12_1$ is regulated so as to become a predetermined value (e.g., a maximum value, a value not smaller than a certain threshold, or a certain set value).

Similarly, in response to an order to switch between optical paths from the control part 19, the mirror driving part $14_2$ adjusts the inclination of the reflecting surface of the mirror $13_2$ such that the light $\lambda_2$ incident on the mirror $13_2$ is reflected thereby so as to be fed to the end face of the output optical fiber $12_2$. Taking the normal direction of the reflecting surface of the mirror $13_2$ after the adjustment as a predetermined direction, the normal direction of the reflecting surface of the mirror $13_2$ is driven by the mirror driving part $14_2$, so as to vibrate at the frequency $f_2$ about the predetermined direction. The light $\lambda_2$ reflected by the reflecting surface of the mirror $13_2$ is fed to the end face of the output optical fiber $12_2$ and propagates through the output optical fiber $12_2$. A part of the guided light is caused to branch out and taken out by the light-branching part $15_2$, so as to be received by the photodiode $16_2$, whereby the detection circuit $17_2$ outputs an electric signal having a value corresponding to the quantity of light received.

As the reflecting surface of the mirror $13_2$ vibrates at the frequency $f_2$, the intensity of the light $\lambda_2$ propagating through the output optical fiber $12_2$ is intensity-modified at the frequency $f_2$ with time, whereby the electric signal outputted from the detection circuit $17_2$ is also intensity-modified at the frequency $f_2$ with time. The control part 19 detects whether or not the electric signal includes a component of the frequency $f_2$ or whether the component is strong or weak. According to the result of detection, whether or not there is optical coupling of the light $\lambda_2$ from the input optical fiber 11 to the output optical fiber $12_2$ or the extent thereof is determined. Further, according to the result of detection, the mirror driving part $14_2$ adjusts the normal direction of the reflecting surface of the mirror $13_2$ (the predetermined direction to become the center of vibration), such that the extent of optical coupling of the light $\lambda_2$ from the input optical fiber 11 to the output optical fiber $12_2$ is regulated so as to become a predetermined value.

As such, the optical module 2 in accordance with this embodiment directly determines whether or not there is optical coupling from the input optical fiber to the output optical fiber or the extent thereof, and thus can detect and control the extent of optical coupling with a high accuracy. Vibrating the normal direction of the reflecting surface of one mirror $13_1$ at the frequency $f_1$ and the normal direction of the reflecting surface of the other mirror $13_2$ at the frequency $f_2$ ($\neq f_1$) can determine which of the mirrors $13_1$, $13_2$ reflects the light coupled to the output optical fiber $12_1$, $12_2$. Vibrating the normal direction of the reflecting surface of the mirror reflecting one light component $\lambda_1$ emitted from the end face of one input optical fiber 11 at the frequency $f_1$ and the normal direction of the reflecting surface of the mirror reflecting the other light component $\lambda_2$ emitted from the end face of the input optical fiber 11 at the frequency $f_2$ ($\neq f_1$) can determine which wavelength of light is coupled to the optical fiber $12_1$, $12_2$.

Third Embodiment

Figure 3:
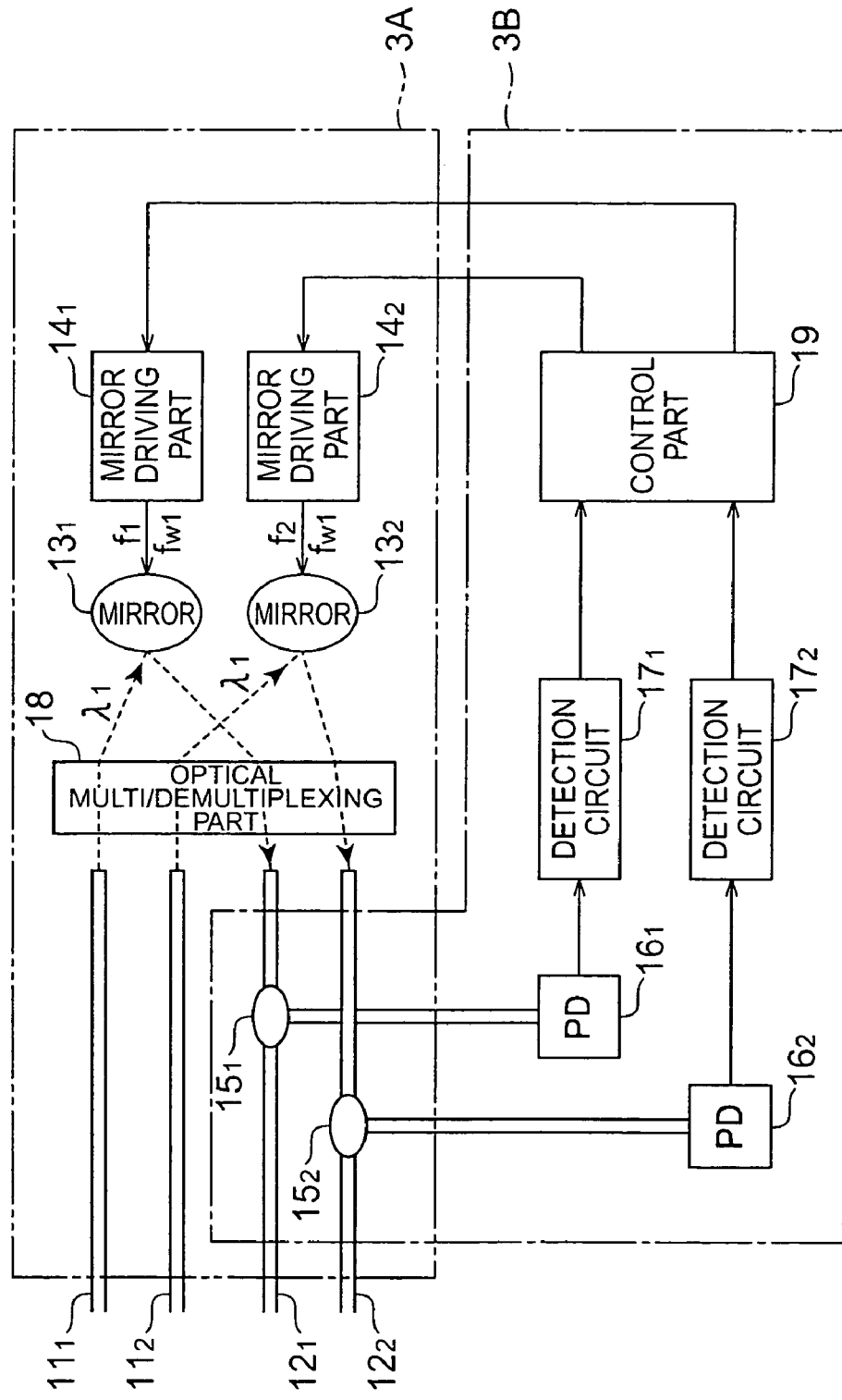
FIG. 3 is a diagram which shows a configuration of an optical module 3 in accordance with the third embodiment.

A third embodiment of the optical device control apparatus and method and optical module in accordance with the present invention will now be explained. FIG. 3 is a diagram which shows a configuration of the optical module 3 in accordance with the third embodiment. The optical module 3 shown in this drawing comprises an optical device 3A and an optical device control apparatus 3B. The optical device 3A includes input optical fibers $11_1$, $11_2$; output optical fibers $12_1$, $12_2$; mirrors $13_1$, $13_2$; and mirror driving parts $14_1$, $14_2$. Two wavelengths $\lambda_1$, $\lambda_2$ of light emitted from the end faces of the input optical fibers $11_1$, $11_2$ are made incident on the end face of any of the output optical fibers $12_1$, $12_2$. The optical device control apparatus 3B includes light-branching parts $15_1$, $15_2$; photodiodes $16_1$, $16_2$; detection circuits $17_1$, $17_2$; an optical multi/demultiplexing part 18; and a control part 19; and controls the optical device 3A. The optical module 3 in accordance with the third embodiment differs from the optical module 2 in accordance with the second embodiment in that it comprises two input optical fibers $11_1$, $11_2$ and in that each of the reflecting surfaces of the mirrors $13_1$, $13_2$ is inclinable with respect to two axes.

The optical multi/demultiplexing part 18 inputs and demultiplexes multiplexed light having two wavelengths $\lambda_1$, $\lambda_2$ emitted from the end faces of the input optical fibers $11_1$, $11_2$, and outputs the demultiplexed light components to the mirrors $13_1$, $13_2$. The mirror $13_1$ reflects the light outputted from the optical multi/demultiplexing part 18, such that thus reflected light is incident on the end face of any of the output optical fibers $12_1$, $12_2$. On the other hand, the mirror $13_2$ reflects the light outputted from the optical multi/demultiplexing part 18, such that thus reflected light is incident on the end face of any of the output optical fibers $12_1$, $12_2$.

Each of the reflecting surfaces of the mirrors $13_1$, $13_2$ is inclinable with respect to two axes. The control part 19 vibrates the normal direction of the reflecting surface of the mirror reflecting the light emitted from the end face of one input optical fiber $11_1$ at a frequency $f_{f1}$ on a first surface, and the normal direction of the reflecting surface of the mirror reflecting the light emitted from the end face of the other input optical fiber $11_2$ at a frequency $f_{f2}$ ($\neq f_{f1}$) on the first surface. The control part 19 vibrates the normal direction of the reflecting surface of the mirror reflecting the light $\lambda_1$ at a frequency $f_{w1}$ on a second surface, and the normal direction of the reflecting surface of the mirror reflecting the light $\lambda_2$ at a frequency $f_{w2}$ ($\neq f_{w1}$) on the second surface. The first surface is a virtual plane in which the normal direction of the reflecting surface exists when the mirror vibrates with respect to the first axis, whereas the second surface is a virtual plane in which the normal direction of the reflecting surface exists when the mirror vibrates with respect to the second axis. The first and second surfaces differ from each other. For example, when the mirror $13_1$ reflects the light $\lambda_1$ outputted from the input optical fiber $11_1$, the normal direction of the reflecting surface of the mirror $13_1$ vibrates at the frequency $f_{f1}$ on the first surface and at the frequency $f_{w1}$ on the second surface.

In FIG. 3, the control part 19 causes the mirror $13_1$ to reflect the light $\lambda_1$ demultiplexed by the optical multi/demultiplexing part 18 after being outputted from the end face of the input optical fiber $11_1$, so as to make it incident on the end face of the output optical fiber $12_1$, and causes the mirror $13_2$ to reflect the light $\lambda_1$ demultiplexed by the optical multi/demultiplexing part 18 after being outputted from the end face of the input optical fiber $11_2$, so as to make it incident on the end face of the output optical fiber $12_2$.

The control part 19 orders the mirror driving part $14_1$ to vibrate the normal direction of the reflecting surface of the mirror $13_1$ about a predetermined direction at the frequency $f_{f1}$ on the first surface and at the frequency $f_{w1}$ on the second surface, detects respective components of the frequencies $f_{f1}$, $f_{w1}$ in the electric signal outputted from the detection circuit $17_1$, and determines whether or not there is optical coupling of the light $\lambda_1$ from the input optical fiber $11_1$ to the output optical fiber $12_1$ or the extent thereof according to the result of detection. Further, according to the result of detection, the control part 19 orders the mirror driving part $14_1$ to adjust the normal direction of the reflecting surface of the mirror $13_1$, thereby controlling the extent of optical coupling of the light $\lambda_1$ from the input optical fiber $11_1$ to the output optical fiber $12_1$.

Also, the control part 19 orders the mirror driving part $14_2$ to vibrate the normal direction of the reflecting surface of the mirror $13_2$ about a predetermined direction at the frequency $f_{f2}$ on the first surface and at the frequency $f_{w1}$ on the second surface, detects respective components of the frequencies $f_{f2}$, $f_{w1}$ in the electric signal outputted from the detection circuit $17_2$, and determines whether or not there is optical coupling of the light $\lambda_1$ from the input optical fiber $11_2$ to the output optical fiber $12_2$ or the extent thereof according to the result of detection. Further, according to the result of detection, the control part 19 orders the mirror driving part $14_2$ to adjust the normal direction of the reflecting surface of the mirror $13_2$, thereby controlling the extent of optical coupling of the light $\lambda_1$ from the input optical fiber $11_2$ to the output optical fiber $12_2$.

An example of operation of the optical module 3 in accordance with the third embodiment will now be explained together with the optical device control method in accordance with the third embodiment. Under the control of the control part 19, the optical module 3 operates as follows, for example. The light component at the wavelength $\lambda_1$ in the light outputted from the end face of one input optical fiber $11_1$ is made incident on the reflecting surface of the mirror $13_1$ by way of the optical multi/demultiplexing part 18, whereas the light component at the wavelength $\lambda_1$ in the light outputted from the end face of the other input optical fiber $11_2$ is made incident on the reflecting surface of the mirror $13_2$ by way of the optical multi/demultiplexing part 18.

In response to an order to switch between optical paths from the control part 19, the mirror driving part $14_1$ adjusts the inclination of the reflecting surface of the mirror $13_1$ such that the light $\lambda_1$ incident on the mirror $13_1$ is reflected thereby so as to be fed to the end face of the output optical fiber $12_1$. Taking the normal direction of the reflecting surface of the mirror $13_1$ after the adjustment as a predetermined direction, the normal direction of the reflecting surface of the mirror $13_1$ is driven by the mirror driving part $14_1$, so as to vibrate about the predetermined direction at the frequency $f_{f1}$ on the first surface and at the frequency $f_{w1}$ on the second surface. The light $\lambda_1$ reflected by the reflecting surface of the mirror $13_1$ is fed to the end face of the output optical fiber $12_1$ and propagates through the output optical fiber $12_1$. A part of the guided light is caused to branch out and taken out by the light-branching part $15_1$, so as to be received by the photodiode $16_1$, whereby the detection circuit $17_1$ outputs an electric signal having a value corresponding to the quantity of light received.

The intensity of the light $\lambda_1$ propagated through the output optical fiber $12_1$ as the reflecting surface of the mirror $13_1$ vibrates at the frequencies $f_{f1}$, $f_{w1}$ includes the respective intensity modulation components at the frequencies $f_{f1}$, $f_{w1}$. The electric signal outputted from the detection circuit $17_1$ also includes the respective intensity modulation components at the frequencies $f_{f1}$, $f_{w1}$. The control part 19 detects whether or not the components of frequencies $f_{f1}$, $f_{w1}$ are included in the electric signal or whether they are strong or weak, and determines whether or not there is optical coupling of the light $\lambda_1$ from the input optical fiber $11_1$ to the output optical fiber $12_1$ or the extent thereof according to the result of detection. Further, according to the result of detection, the mirror driving part $14_1$ adjusts the normal direction of the reflecting surface of the mirror $13_1$ (the predetermined direction to become the center of vibration), such that the extent of optical coupling of the light $\lambda_1$ from the input optical fiber $11_1$ to the output optical fiber $12_1$ is regulated so as to become a predetermined value (e.g., a maximum value, a value not smaller than a certain threshold, or a certain set value).

Similarly, in response to an order to switch between optical paths from the control part 19, the mirror driving part $14_2$ adjusts the inclination of the reflecting surface of the mirror $13_2$ such that the light $\lambda_1$ incident on the mirror $13_2$ is reflected thereby so as to be fed to the end face of the output optical fiber $12_2$. Taking the normal direction of the reflecting surface of the mirror $13_2$ after the adjustment as a predetermined direction, the normal direction of the reflecting surface of the mirror $13_2$ is driven by the mirror driving part $14_2$, so as to vibrate about the predetermined direction at the frequency $f_{f2}$ on the first surface and at the frequency $f_{w1}$ on the second surface. The light $\lambda_1$ reflected by the reflecting surface of the mirror $13_2$ is fed to the end face of the output optical fiber $12_2$ and propagates through the output optical fiber $12_2$. A part of the guided light is caused to branch out and taken out by the light-branching part $15_2$, so as to be received by the photodiode $16_2$, whereby the detection circuit $17_2$ outputs an electric signal having a value corresponding to the quantity of light received.

The intensity of the light $\lambda_1$ propagated through the output optical fiber $12_2$ as the reflecting surface of the mirror $13_2$ vibrates at the frequencies $f_{f2}$, $f_{w1}$ includes the respective intensity modulation components at the frequencies $f_{f2}$, $f_{w1}$. The electric signal outputted from the detection circuit $17_2$ also includes the respective intensity modulation components at the frequencies $f_{f2}$, $f_{w1}$. The control part 19 detects whether or not the components of frequencies $f_{f2}$, $f_{w1}$ are included in the electric signal or whether they are strong or weak, and determines whether or not there is optical coupling of the light $\lambda_1$ from the input optical fiber $11_2$ to the output optical fiber $12_2$ or the extent thereof according to the result of detection. Further, according to the result of detection, the mirror driving part $14_2$ adjusts the normal direction of the reflecting surface of the mirror $13_2$ (the predetermined direction to become the center of vibration), whereby the extent of optical coupling of the light $\lambda_1$ from the input optical fiber $11_2$ to the output optical fiber $12_2$ is regulated so as to become a predetermined value.

As such, the optical module 3 in accordance with this embodiment directly determines whether or not there is optical coupling from the input optical fiber to the output optical fiber, and thus can detect and control the extent of optical coupling with a high accuracy. Also, since each mirror is configured such that an input optical fiber can be identified by the frequency of vibration of the normal direction of the reflecting surface on the first surface, and the wavelength of light can be identified by the frequency of vibration of the normal direction of the reflecting surface on the second surface, it can be determined at which wavelength and from which input optical fiber the light is coupled to an output optical fiber. Also, while the number of mirror vibration frequencies required is assumed to be "the number of input optical fibers×the number of multiplexed wavelengths" as an extension of the second embodiment, the number of mirror vibration frequencies required in this embodiment is reduced to "the number of input optical fibers+the number of multiplexed wavelengths".

As described above about the predetermined embodiments, the present invention can detect and control with a high accuracy whether or not there is optical coupling or an extent thereof in an optical device.

What is claimed is:

1. An optical device control apparatus for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the apparatus comprising:
a light-branching part for taking out a part of the light propagating through the output optical waveguide after being made incident thereon;
a light-detecting part for detecting an intensity of the light taken out by the light-branching part and outputting an electric signal having a value corresponding to thus detected intensity of light; and
a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to the result of the detection,
wherein the optical device comprises a plurality of input optical waveguides; and
wherein the control part orders the mirror driving part to vibrate the normal direction of the reflecting surface of the mirror at respective frequencies different from each other for the input optical waveguides.

2. An optical module comprising:
an optical device including a mirror in which light emitted from an input optical waveguide is reflected by an inclinable reflecting surface so as to be made incident on an output optical waveguide, and a mirror driving part for adjusting an inclination of the reflecting surface of the mirror; and
the optical device control apparatus according to claim 1 for controlling the optical device.

3. An optical device control apparatus for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the apparatus comprising:
a light-branching part for taking out a part of the light propagating through the output optical waveguide after being made incident thereon;
a light-detecting part for detecting an intensity of the light taken out by the light-branching part and outputting an electric signal having a value corresponding to thus detected intensity of light; and
a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to the result of the detection,
wherein the optical device further comprises an optical multi/demultiplexing part for multiplexing or demultiplexing light onto an optical path from the input optical waveguide to the output optical waveguide; and
wherein the control part orders the mirror driving part to vibrate the normal direction of the reflecting surface of the mirror at respective frequencies different from each other for wavelengths of light multiplexed or demultiplexed by the optical multi/demultiplexing part.

4. An optical module comprising:
an optical device including a mirror in which light emitted from an input optical waveguide is reflected by an inclinable reflecting surface so as to be made incident on an output optical waveguide, and a mirror driving part for adjusting an inclination of the reflecting surface of the mirror; and
the optical device control apparatus according to claim 3 for controlling the optical device.

5. An optical device control apparatus for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the apparatus comprising:
a light-branching part for taking out a part of the light propagating through the output optical waveguide after being made incident thereon;
a light-detecting part for detecting an intensity of the light taken out by the light-branching part and outputting an electric signal having a value corresponding to thus detected intensity of light; and
a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to the result of the detection,
wherein the optical device comprises a plurality of input optical waveguides, and further comprises an optical multi/demultiplexing part for multiplexing or demultiplexing light onto an optical path from the input optical waveguide to the output optical waveguide, the reflecting surface of the mirror being inclinable about each of two axes;
wherein the control part orders the mirror driving part to vibrate the normal direction of the reflecting surface of the mirror on a first surface at respective frequencies different from each other for the plurality of input optical waveguides, and vibrate the normal direction of the reflecting surface of the mirror on a second surface at respective frequencies different from each other for wavelengths of light multiplexed or demultiplexed by the optical multi/demultiplexing part.

6. An optical module comprising:
an optical device including a mirror in which light emitted from an input optical waveguide is reflected by an inclinable reflecting surface so as to be made incident on an output optical waveguide, and a mirror driving part for adjusting an inclination of the reflecting surface of the mirror; and
the optical device control apparatus according to claim 5 for controlling the optical device.

7. An optical device control apparatus for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the apparatus comprising:

a light-branching part for taking out a part of the light propagating through the output optical waveguide after being made incident thereon;

a light-detecting part for detecting an intensity of the light taken out by the light-branching part and outputting an electric signal having a value corresponding to thus detected intensity of light; and a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to the result of the detection, wherein the control part orders, in response to a request from outside, the mirror driving part to vibrate the reflecting surface of the mirror and detects the component of the predetermined frequency in the electric signal outputted from the light-detecting part.

8. An optical module comprising:

an optical device including a mirror in which light emitted from an input optical waveguide is reflected by an inclinable reflecting surface so as to be made incident on an output optical waveguide, and a mirror driving part for adjusting an inclination of the reflecting surface of the mirror; and the optical device control apparatus according to claim 7 for controlling the optical device.

9. An optical device control apparatus for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the apparatus comprising:

a light-branching part for taking out a part of the light propagating through the output optical waveguide after being made incident thereon;

a light-detecting part for detecting an intensity of the light taken out by the light-branching part and outputting an electric signal having a value corresponding to thus detected intensity of light; and a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to the result of the detection, wherein the optical device comprises a plurality of mirrors; and wherein the control part orders the mirror driving part to vibrate the reflecting surface of the mirror and detects the component of the predetermined frequency in the electric signal outputted from the light-detecting part sequentially for the plurality of mirrors.

10. An optical module comprising:

an optical device including a mirror in which light emitted from an input optical waveguide is reflected by an inclinable reflecting surface so as to be made incident on an output optical waveguide, and a mirror driving part for adjusting an inclination of the reflecting surface of the mirror; and the optical device control apparatus according to claim 9 for controlling the optical device.

11. An optical device control apparatus for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the apparatus comprising:

a light-branching part for taking out a part of the light propagating through the output optical waveguide after being made incident thereon;

a light-detecting part for detecting an intensity of the light taken out by the light-branching part and outputting an electric signal having a value corresponding to thus detected intensity of light; and a control part for ordering the mirror driving part to vibrate a normal direction of the reflecting surface of the mirror at a predetermined frequency about a predetermined direction, detecting a component of the predetermined frequency in the electric signal outputted from the light-detecting part, and determining whether or not there is optical coupling from the input optical waveguide to the output optical waveguide or an extent thereof according to the result of the detection, wherein the optical device comprises a plurality of mirrors; and wherein the control part orders the mirror driving part to vibrate the reflecting surface of the mirror and detects the component of the predetermined frequency in the electric signal outputted from the light-detecting part simultaneously for the plurality of mirrors.

12. An optical module comprising:

an optical device including a mirror in which light emitted from an input optical waveguide is reflected by an inclinable reflecting surface so as to be made incident on an output optical waveguide, and a mirror driving part for adjusting an inclination of the reflecting surface of the mirror; and the optical device control apparatus according to claim 11 for controlling the optical device.

13. An optical device control method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the method comprising the steps of:

taking out a part of the light propagating through the output optical waveguide after being made incident thereon;

obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to the result of the detection, wherein the optical device comprises a plurality of input optical waveguides; and wherein the method orders the mirror driving part to vibrate the normal direction of the reflecting surface of the mirror at respective frequencies different from each other for the input optical waveguides.

14. An optical device control method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the method comprising the steps of:

taking out a part of the light propagating through the output optical waveguide after being made incident thereon;

obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to the result of the detection, wherein the optical device further comprises an optical multi/demultiplexing part for multiplexing or demultiplexing light onto an optical path from the input optical waveguide to the output optical waveguide; and wherein the method orders the mirror driving part to vibrate the normal direction of the reflecting surface of the mirror at respective frequencies different from each other for wavelengths of light multiplexed or demultiplexed by the optical multi/demultiplexing part.

15. An optical device control method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the method comprising the steps of:

taking out a part of the light propagating through the output optical waveguide after being made incident thereon;

obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to the result of the detection, wherein the optical device comprises a plurality of input optical waveguides, and further comprises an optical multi/demultiplexing part for multiplexing or demultiplexing light onto an optical path from the input optical waveguide to the output optical waveguide, the reflecting surface of the mirror being inclinable about each of two axes;

wherein the method orders the mirror driving part to vibrate the normal direction of the reflecting surface of the mirror on a first surface at respective frequencies different from each other for the plurality of input optical waveguides, and vibrate the normal direction of the reflecting surface of the mirror on a second surface at respective frequencies different from each other for wavelengths of light multiplexed or demultiplexed by the optical multi/demultiplexing part.

16. An optical device control method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the method comprising the steps of:

taking out a part of the light propagating through the output optical waveguide after being made incident thereon;

obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to the result of the detection, wherein the method orders, in response to a request from outside, the mirror driving part to vibrate the reflecting surface of the mirror and detects the component of the predetermined frequency in the electric signal.

17. An optical device control method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the method comprising the steps of:

taking out a part of the light propagating through the output optical waveguide after being made incident thereon;

obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to the result of the detection, wherein the optical device comprises a plurality of mirrors; and wherein the method orders the mirror driving part to vibrate the reflecting surface of the mirror and detects the component of the predetermined frequency in the electric signal sequentially for the plurality of mirrors.

18. An optical device control method for controlling an optical device including a mirror in which light emitted from an input optical waveguide is reflected by an inclinable reflecting surface so as to be made incident on an output optical waveguide, and a mirror driving part for adjusting an inclination of the reflecting surface of the mirror;

the method comprising the steps of:

taking out a part of the light propagating through the output optical waveguide after being made incident thereon;

obtaining an electric signal having a value corresponding to an intensity of the part of the light; and ordering the mirror driving part to vibrate a normal direction of the reflecting surface of the mirror at a predetermined frequency about a predetermined direction, detecting a component of the predetermined frequency in the electric signal, and determining whether or not there is optical coupling from the input optical waveguide to the output optical waveguide or an extent thereof according to the result of the detection, wherein the optical device comprises a plurality of mirrors; and wherein the method orders the mirror driving part to vibrate the reflecting surface of the mirror and detects the component of the predetermined frequency in the electric signal simultaneously for the plurality of mirrors.

* * * * *